United States Patent [19]
Grandi

[11] Patent Number: 5,806,703
[45] Date of Patent: Sep. 15, 1998

[54] SAFETY VALVE DEVICE FOR PACKAGINGS CONTAINING PRODUCTS TO BE COOKED, COOLED, REHEATED OR DEGASSED

[76] Inventor: René Grandi, Via Marco 4, Campione d'Italia, Italy

[21] Appl. No.: 716,283

[22] PCT Filed: Mar. 30, 1995

[86] PCT No.: PCT/FR95/00408

§ 371 Date: Sep. 30, 1996

§ 102(e) Date: Sep. 30, 1996

[87] PCT Pub. No.: WO95/26912

PCT Pub. Date: Oct. 12, 1995

[30] Foreign Application Priority Data

Mar. 31, 1994 [FR] France .................................. 94 03945

[51] Int. Cl.⁶ ................................................. B65D 51/16
[52] U.S. Cl. .............................. 220/203.15; 220/203.02; 220/203.11; 220/373
[58] Field of Search ........................ 220/203.01, 203.02, 220/203.09, 203.11, 203.13, 203.15, 203.16, 366.1, 367.1, 369, 373; 215/307, 309, 310; 383/100, 103

[56] References Cited

U.S. PATENT DOCUMENTS

| | | |
|---|---|---|
| 1,529,246 | 3/1925 | Fenn ................................... 220/203.16 |
| 2,027,137 | 1/1936 | Yeomans . |
| 3,432,087 | 3/1969 | Costello .................................. 383/103 |
| 4,000,846 | 1/1977 | Glbert ..................................... 383/103 |
| 5,587,192 | 12/1996 | Beizermann ..................... 220/366.1 X |

FOREIGN PATENT DOCUMENTS

| | | |
|---|---|---|
| 662560 | 7/1938 | Germany . |
| 463961 | 2/1952 | Italy ................................. 220/203.01 |

*Primary Examiner*—Jes F. Pascua
*Attorney, Agent, or Firm*—Greenblum & Bernstein, P.L.C.

[57] ABSTRACT

A safety valve device for packages of products to be cooked, cooled, reheated, or degassed and a package that includes such a safety valve. The valve includes a peripheral portion attached to the package support and a movable flap with an end portion connected to the peripheral portion to form a hinge portion exerting a resilient return force determined by bending slots shaped so that the end portion retains a certain degree of rigidity and has a sensitive shape memory function, enabling it to be opened by gas pressure and dynamically closed upon cooling. A projection on the underside of the flap acts as seal engaging the recess in the package support during cooling, and includes suitably positioned spikes for engaging one or more gas discharge outlets in the recess.

23 Claims, 2 Drawing Sheets

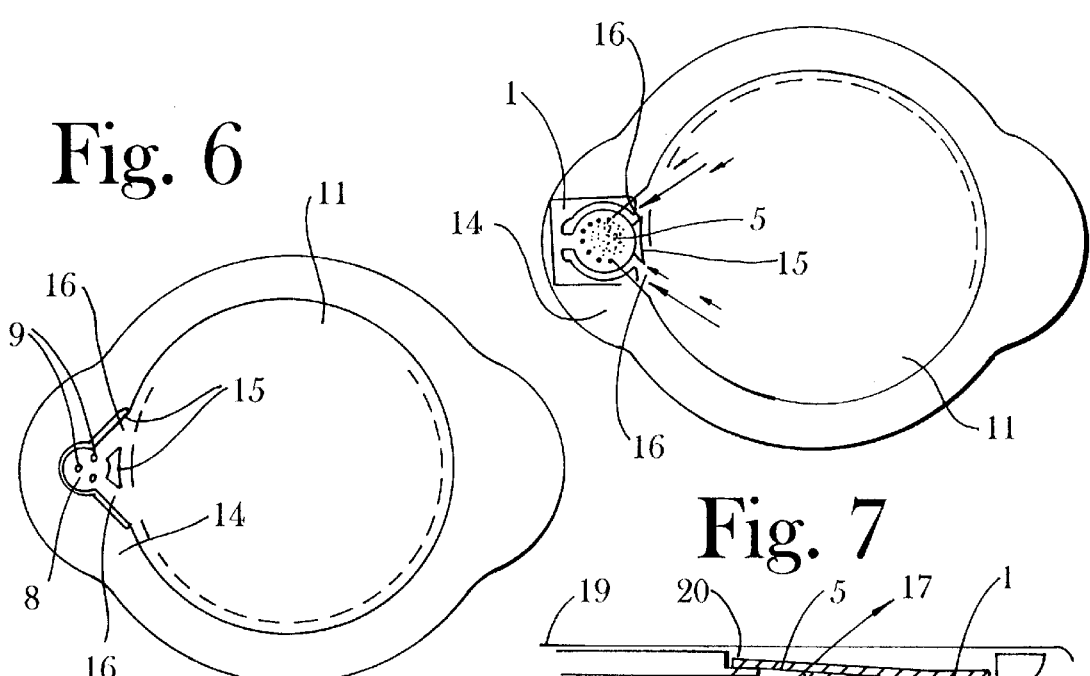
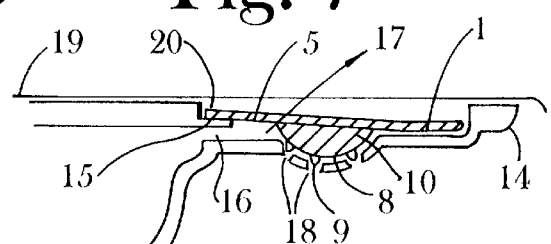
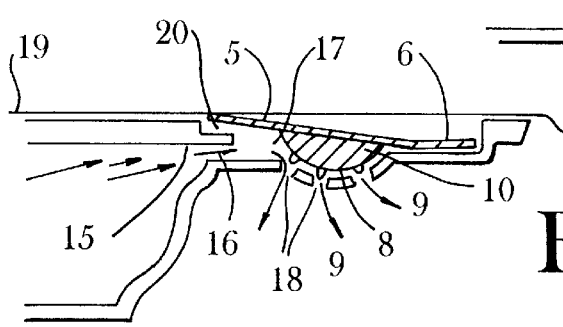
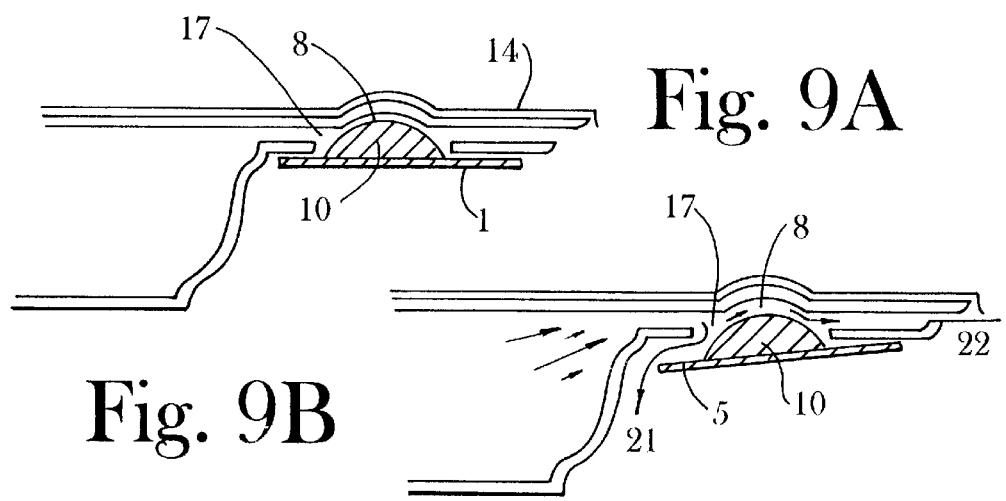

SAFETY VALVE DEVICE FOR PACKAGINGS CONTAINING PRODUCTS TO BE COOKED, COOLED, REHEATED OR DEGASSED

BACKGROUND OF THE INVENTION

1. Field of the Invention

The invention relates to a device adapted to discharge steam, vapors or gasses and serves as an opening device during cooking, reheating or storage of food products in their packaging on which it is applied, and serves as a closing device during cooling of the food products, while still in their packaging. This device is necessary because the cooking of food in a sealed container, as is known when using microwaves, often causes the latter to burst.

2. Description of Background and Revelant Information

Cooling of hot products under certain packaging conditions causes a partial vacuum, and poor sealing cannot maintain the products in a sterilized or apertized condition. It is particularly recommended for food products to be reheated in a microwave wherein it is presently recommended to pierce the packaging to prevent a certain bursting of the entire container.

Devices are known which form valves or safety flaps applied on packagings made of cardboard, plastics, aluminum, or other food packagings. Although these devices enable the discharge of vapors during heating, cooking or reheating, they do not make it possible, during cooling, to block the discharge outlet and to seal the packaging in order to prevent any penetration of air, and therefore of any bacteria in the products that are thus no longer sterilized, which causes their degradation.

Furthermore, certain known devices, especially systems having a wax fuse which blocks the discharge outlet and is melted by the heat to let the vapors out. But the wax can no longer be efficient during cooling, since it is gone.

All of these systems do not function to the maximum as required, and the lack of sealing often does not allow for an efficient transportation of the products without risk of overflow, since the packagings must be sealed again manually.

The criteria necessary for preserving the products in a sterilized condition in the known systems are difficult to control.

SUMMARY OF THE INVENTION

It is an object of the present invention to avoid the disadvandages described above and enable a good discharge of vapors, by means of a certain lifting flexibility, while maintaining a certain rigidity for the constant pressure of dynamic closure in view of the cooling and canning or semi-canning of the products.

This device can also be reused to heat or cool the products in a container, at will, without any manual intervention on the device itself. Thus, food, while still in the same tray, can be kept cooled, then cooked, then frozen, and then reheated for consumption.

This device, that is referred to hereinafter as the valve, can be adapted to the containers of any food products or beverages such as fruit juices, or to any packagings for hot sandwiches, French toasts, pizzas, etc., and also for degassing products such as coffee. It is even recommended when using boat-shaped trays for cooking or reheating in a microwave.

The packagings may or may not be initially formed with a cavity for receiving the valve. The products can be transported without risks of overflow or bacterial attack. It can be used on packagings that are rigid or have rigid lids as well as directly on a boat-shaped tray sealed by a film, where it is then applied on or beneath the edge of the tray or of the container. It can also be covered with an adhesive film.

This valve can also be thermoformed or injected in the same manufacturing mold as the tray or the lid itself of the packaging.

It is made of a plastic material resisting high temperatures and, for certain packagings, it can be made of steel or any other material that meets the same requirements.

It is presented in one-piece whose peripheral portion is fixed or adhered on the packaging support. An inner slot clears a movable, but rigid, flap whose end portion is connected to the peripheral portion, and which is determined by "deformation" slots whose shape is calculated so as to maintain a certain rigidity and obtain a retraction "active memory" sensitizes this end portion, during the refrigeration of the products or in the absence of pressure from gas vapors, forming a hinge zone to ensure an efficient spring return, while maintaining its rigidity, and fulfill the required function of dynamic opening and closing. Under the flap, a projection serves as a seal in the cavity of the packaging support during cooling, this projection also comprises one or more "spikes" that are conical to more easily engage in or exit from the discharge outlet(s) of the vapor discharge cavity.

BRIEF DESCRIPTION OF THE DRAWINGS

The invention will be better understood by means of the description that follows, with reference to the annexed drawings showing, by way of non-limiting examples, an embodiment of this device, and in which:

FIGS. 6 and 7 show another example of embodiment of a valve adapted on the edge of a boat-shaped tray;

FIG. 8A is the detailed and cross-sectional view of the device of FIGS. 6 and 7, showing the flap in a closed position;

FIG. 8B is a view like that of FIG. 8A, showing the valve in an open position;

FIG. 9A shows another example of the valve positioning, beneath the edge of a boat-shaped tray and, as mentioned previously, showing the valve in a closed position; and FIG. 9B is a view like that of FIG. 9A showing the valve in an open position.

DETAILED DESCRIPTION OF THE INVENTION

Figure 1:
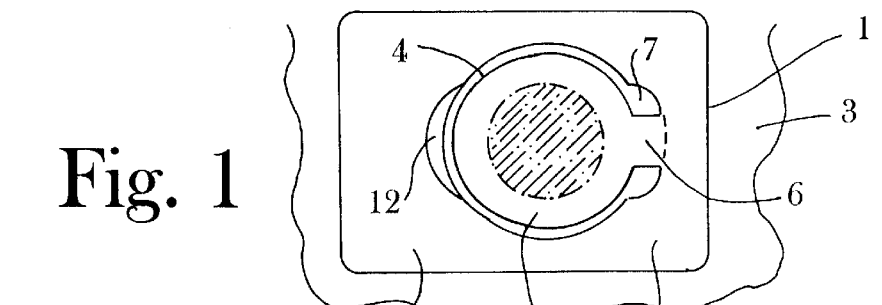
FIG. 1 shows a diagram of the device, seen from the top, designating the specific portions which characterize it.
Figure 2:
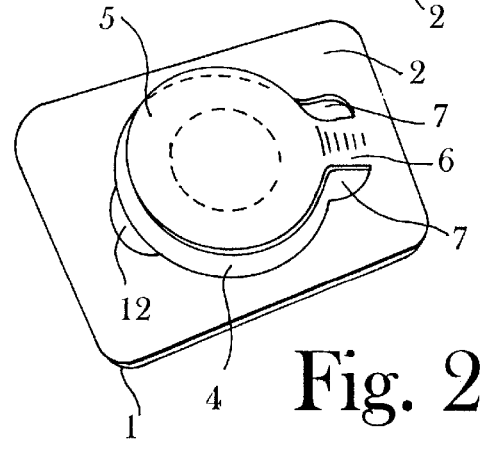
FIGS. 2 and 3 are perspective views of the valve, one being open and the other closed.
Figure 3:
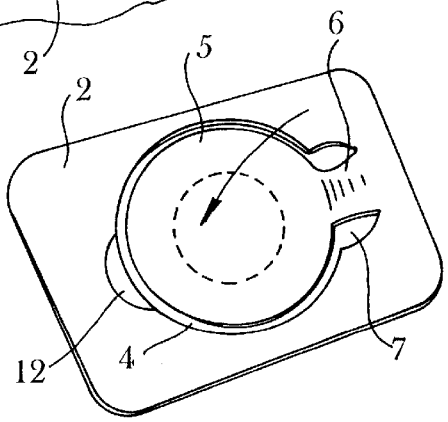

With reference to FIGS. 1, 2, 3, and 4, the valve 1 comprises a fixed peripheral portion 2 adhered on the packaging support 3. The slot 4 clears the flap 5 whose end portion 6, determined by the slots 7, has the appropriate rigidity to obtain an optimum efficiency of a spring return characterized by the "active memory" sensitizing this end portion 6, and forming the hinge to lift or lower the flap 5. A recess 12 makes it possible to introduce a finger, if necessary, to open the valve manually.

Figure 4A:
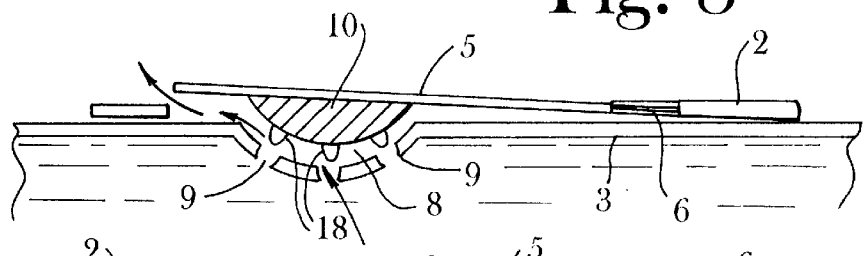
FIG. 4A shows a detailed cross-section of the valve on its packaging support in an open position.
Figure 4B:
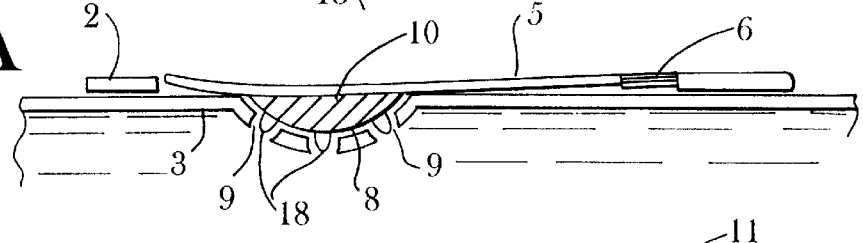
FIG. 4B is a view like that of FIG. 4A, showing the valve in a closed position.

FIGS. 4A and 4B show the cross-section of the valve 1 whose peripheral portion 2 is attached on the packaging support 3. The cavity 8 comprises the outlets 9 of the safety flap for the vapors. In FIG. 4A, during heating, the hot vapor emission moves the projection 10 from the cavity 8 and causes the flap 5 to rise by activating its end portion 6 and allowing the vapors to escape. In FIG. 4B, during cooling, the valve 1 serves as a closing device, the elastic memory of the end portion 6 causes it to retract, by positioning the projection 10 in the cavity 8 of the packaging support. It can also be seen in FIG. 4B that in the closed or rest position, additional projections, such as conical spikes 18, extend from the projection 10 and are seated in the outlets 9.

The valve 1 of the invention is suitable for use on containers of any shape, including containers in the form of boat-shape trays having a film or other coverings, example of which are described below, whereby the container with its covering constitues a package for food items or other products.

Figure 5:
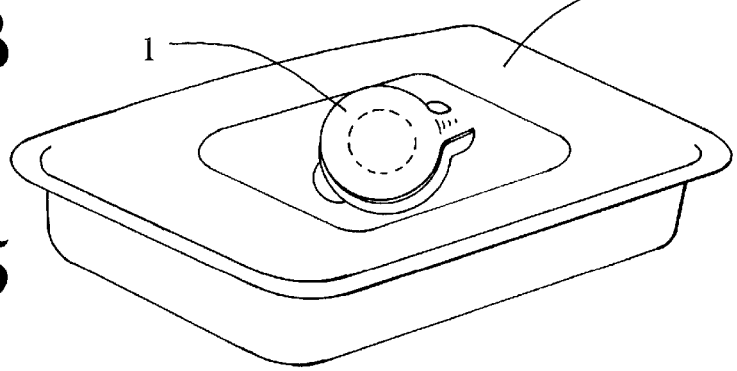
FIG. 5 shows an example of an adaptation of the valve on the lid itself of a boat-shaped tray.

According to one of the alternative embodiments, FIG. 5 shows the valve 1 attached on a covering of a cooking boat-shaped tray 11.

FIG. 6 shows a boat-shaped tray 11 adapted to receive, on its edge 14, the valve that will be fixed on the portions 15 which leave free the recesses or passages 16 so that the excess of vapors is directed to the outlets 9 of the cavity 8.

In FIG. 7, the valve 1 and its flap 5 are positioned on the portions 15 of the edge 14 of the boat-shaped tray and above the passages 16.

In FIGS. 8A and 8B it is noted that the valve 1 is well nested in the edge 14 of the tray wherein it is important to note that the flap 5 must rest on the portion 15 of the tray 11 to clear the passages 16, in order to form a vapor pressure point 17, the portion 15 of the tray thus comprising a flap support. The valve can be thermoformed and can be secured at the same time in the manufacturing mold of the entire boat-shaped tray.

It is covered with a film 19 which forms a pressure; it is also necessary to leave a sufficient space 20 between the support 15 and the film 19 so the flap 5 can be lifted by the vapor pressure. In FIG. 8A, the flap 5 is closed, the projection 10 and the spikes 18 are positioned in the cavity 8 and the outlets 9 forming the vapor pressure point 17 which makes it possible to raise the flap 5. In FIG. 8B, the flap 5 acting on its end portion 6 as well as the projection 10 and the spikes 18 are released, which enables the discharge of the vapors through the outlets 9.

In FIGS. 9A and FIG. 9B, the valve 1 is pressed under the edge 14 of the tray, i.e., the valve is applied to a lower surface of the edge 14, the cavity 8 is then over the top of the edge of the tray, i.e., the cavity 8 is formed in the cover. The cavity 8 does not comprise any outlet because, in this case, the discharge of the vapors will occur through the opening left by the flap, both underneath and on the side of the tray.

In FIG. 9A, the projection 10 is positioned in the cavity 8, sealing the tray. In FIG. 9B, the flap 5 that is opened by the vapor pressure at point 17 makes it possible to evacuate the vapors through the outlets 21 and 22.

However, the forms, the dimensions, the arrangements as well as the means used for embodying the device that has just been described, can vary within the limit of the their equivalents.

We claim:

1. A safety valve for packages of products to be cooked, cooled, reheated, or degassed, said safety valve comprising:
   a peripheral portion to be affixed to a package support of a container;
   a flap defined by slots extending within said peripheral portion, said flap having an end portion connected to said peripheral portion;
   said flap having a projection extending in a direction to be adapted to be housed in a cavity of the package support, said projection having a plurality of additional projections extending in said direction to be adapted to be received in outlets of the cavity of the package support, said flap being adapted to be raised from the package support by gas pressure and to be lowered toward the package support during cooling or upon removal of said gas pressure to close the container.

2. A safety valve according to claim 1, wherein:
   said additional projections comprise conical spikes.

3. A safety valve according to claim 1, wherein said safety valve further comprises:
   means for facilitating raising and lowering of said flap with respect to said package support and with respect to said peripheral portion, said means comprising:
      a hinge zone of said end portion of said flap being made of a material having an elastic memory; and
      said slots include slots on either side of said hinge zone of said end portion of said flap having a predetermined shape.

4. A package assembly for products to be cooked, cooled, reheated, or degassed, said package comprising:
   a container including a package support, said package support having a recessed portion defining a cavity, said recessed portion having outlets formed therein;
   a safety valve comprising:
   a peripheral portion affixed to said package support of said container;
      a flap defined by slots extending within said peripheral portion, said flap having an end portion connected to said peripheral portion;
      said flap having a projection extending in a direction toward said cavity of said package support, said projection having a plurality of additional projections extending in said direction to be received in said outlets of said recessed portion of said package support, said flap being adapted to be raised from said package support by gas pressure and to be lowered toward said package support during cooling or upon removal of said gas pressure to close said container.

5. A safety valve according to claim 4, wherein:
   said additional projections comprise conical spikes.

6. A package assembly according to claim 4, further comprising:
   a covering for placement on said container, wherein said package support comprises at least a portion of said covering.

7. A package assembly according to claim 4, wherein:
   said container comprises a tray;
   said package support comprises an edge of said tray; and
   said package assembly further comprises a covering for said tray.

8. A package assembly according to claim 4, wherein:
   said safety valve further comprises:
      means for facilitating raising and lowering of said flap with respect to said package support and with respect to said peripheral portion, said means comprising:

a hinge zone of said end portion of said flap being made of a material having an elastic memory; and said slots include slots on either side of said hinge zone of said end portion of said flap having a predetermined shape.

9. A package assembly according to claim 8, wherein:

said projection in said cavity is exposed to the gas pressure from an interior of said container for raising said flap and clearing said cavity for discharging gas and vapors from said container.

10. A package assembly according to claim 8, wherein:

said elastic memory of said material of said hinge zone comprises means for exerting an elastic force to move said flap, upon cooling of said container or in an absence of said gas pressure, to position said projection of said flap in said cavity and to position said additional projections in said outlets for sealing said valve.

11. A package assembly according to claim 10, wherein:

said package support comprises a preformed edge of said container;

said container further comprises a flap support;

an edge of said flap rests upon said flap support in a rest position of said flap; and passages are formed to direct the gas pressure to said flap to lift said flap from said flap support.

12. A package assembly according to claim 11, wherein:

said outlets of said recessed portion of said preformed edge of said package support are located to direct gas beneath said preformed edge, whereby as said flap is lifted from said flap support, said additional projections are raised from said outlets for said gas discharge.

13. A package assembly according to claim 12, wherein:

said package assembly further comprises a film covering for said container and to be positioned over said safety valve; and a space is provided between said flap support and said film covering for enabling raising of said flap from said flap support in a direction toward said film covering by gas pressure.

14. A package assembly according to claim 11, wherein:

said package assembly further comprises a film covering for said container and to be positioned over said safety valve; and a space is provided between said flap support and said film covering for enabling raising of said flap from said flap support in a direction toward said film covering by gas pressure.

15. A package assembly according to claim 8, wherein:

said package support comprises a preformed edge of said container;

said container further comprises a flap support;

an edge of said flap rests upon said flap support in a rest position of said flap; and passages are formed to direct the gas pressure to said flap to lift said flap from said flap support.

16. A package assembly according to claim 15, wherein:

said outlets of said recessed portion of said preformed edge of said package support are located to direct gas beneath said preformed edge, whereby as said flap is lifted from said flap support, said additional projections are raised from said outlets for said gas discharge.

17. A package assembly according to claim 16, wherein:

said package assembly further comprises a film covering for said container and to be positioned over said safety valve; and a space is provided between said flap support and said film covering for enabling raising of said flap from said flap support in a direction toward said film covering by gas pressure.

18. A package assembly according to claim 15, wherein:

said package assembly further comprises a film covering for said container and to be positioned over said safety valve; and a space is provided between said flap support and said film covering for enabling raising of said flap from said flap support in a direction toward said film covering by gas pressure.

19. A package assembly according to claim 14, wherein:

said projection in said cavity is exposed to the gas pressure from an interior of said container for raising said flap and clearing said cavity for discharging gas and vapors from said container.

20. A package assembly according to claim 4, wherein:

said package support comprises a preformed edge of said container;

said container further comprises a flap support;

an edge of said flap rests upon said flap support in a rest position of said flap; and passages are formed to direct the gas pressure to said flap to lift said flap from said flap support.

21. A package assembly according to claim 20, wherein:

said outlets of said recessed portion of said preformed edge of said package support are located to direct gas beneath said preformed edge, whereby as said flap is lifted from said flap support, said additional projections are raised from said outlets for said gas discharge.

22. A package assembly according to claim 21, wherein:

said package assembly further comprises a film covering for said container and to be positioned over said safety valve; and a space is provided between said flap support and said film covering for enabling raising of said flap from said flap support in a direction toward said film covering by gas pressure.

23. A package assembly according to claim 20, wherein:

said package assembly further comprises a film covering for said container and to be positioned over said safety valve; and a space is provided between said flap support and said film covering for enabling raising of said flap from said flap support in a direction toward said film covering by gas pressure.

* * * * *